US006958378B2

(12) United States Patent
Yang et al.

(10) Patent No.: US 6,958,378 B2
(45) Date of Patent: Oct. 25, 2005

(54) METHOD FOR PRODUCING HOMO-AND CO-POLYMERS OF ETHYLENE

(75) Inventors: Chun-Byung Yang, Daejon-shi (KR); Sang-Yull Kim, Daejon-shi (KR); Yong-Bok Lee, Daejon-shi (KR); Weon Lee, Daejon (KR)

(73) Assignee: Samsung Atofina Co., Ltd., ChungNam (KR)

( * ) Notice: Subject to any disclaimer, the term of this patent is extended or adjusted under 35 U.S.C. 154(b) by 216 days.

(21) Appl. No.: 10/416,382

(22) PCT Filed: Nov. 9, 2001

(86) PCT No.: PCT/KR01/01906

§ 371 (c)(1), (2), (4) Date: Nov. 10, 2003

(87) PCT Pub. No.: WO02/38623

PCT Pub. Date: May 16, 2002

(65) Prior Publication Data

US 2004/0068064 A1 Apr. 8, 2004

(30) Foreign Application Priority Data

Nov. 9, 2000 (KR) ........................................ 2000-66413

(51) Int. Cl.[7] ........................... C08F 110/02; C08F 4/42

(52) U.S. Cl. ................. 526/352; 526/123.1; 526/124.3; 526/130; 526/141; 502/103; 502/127; 502/123; 502/116

(58) Field of Search .............................. 526/352, 123.1, 526/124.3, 130, 141; 502/103, 127, 123, 116

(56) References Cited

U.S. PATENT DOCUMENTS 3,332,927 A 7/1967 Cottingham
3,632,620 A 1/1972 Kober et al.
3,642,746 A 2/1972 Kashiwa et al.
3,642,772 A 2/1972 Haid et al.
3,878,124 A 4/1975 Durand et al.
3,899,477 A 8/1975 Altemore et al.
3,953,414 A 4/1976 Galli et al.
4,013,823 A 3/1977 Longi et al.
4,069,169 A 1/1978 Toyota et al.
4,071,672 A 1/1978 Kashiwa
4,071,674 A 1/1978 Kashiwa et al.
4,076,924 A 2/1978 Toyota et al.
4,085,276 A * 4/1978 Toyota et al. ............... 526/122
4,107,413 A 8/1978 Giannini et al.
4,107,414 A 8/1978 Giannini et al.
4,107,415 A 8/1978 Giannini et al.
4,111,835 A 9/1978 Foschini et al.
4,148,756 A 4/1979 Langer, Jr.
4,156,063 A 5/1979 Giannini et al.
4,157,435 A 6/1979 Toyota et al.
4,158,642 A 6/1979 Langer, Jr.
4,187,196 A 2/1980 Giannini et al.
4,220,554 A 9/1980 Scatt et al.
4,226,963 A 10/1980 Giannini et al.
4,263,169 A 4/1981 Scata et al.
4,277,372 A 7/1981 Matlack
4,315,835 A 2/1982 Scatt al.
4,315,874 A 2/1982 Ushida et al.
4,330,649 A 5/1982 Kioka et al.
4,336,360 A 6/1982 Giannini et al.
4,355,143 A 10/1982 Lassalle et al.
4,380,507 A 4/1983 Noristi et al.
4,384,983 A 5/1983 Hoff
4,390,671 A 6/1983 Imai et al.
4,399,054 A 8/1983 Ferraris et al.
4,401,589 A 8/1983 Kioka et al.
4,434,282 A 2/1984 Esneault
4,439,540 A 3/1984 Cecchin et al.
4,477,639 A 10/1984 Nielsen
4,482,687 A 11/1984 Noshay et al.
4,487,846 A 12/1984 Bailly et al.
4,514,513 A 4/1985 Sato et al.
4,518,706 A 5/1985 Gessell
4,529,716 A 7/1985 Banzi et al.
4,579,833 A 4/1986 Collomb et al.

(Continued)

FOREIGN PATENT DOCUMENTS

DE 2553104 6/1977
DE 3636060 5/1988
EP 0131832 7/1984

(Continued)

OTHER PUBLICATIONS

Wen et al. "Mechanics of Fluidization" Chemical Engineering Progress Symposium Series, 1962, vol. 62, 100–111.

(Continued)

*Primary Examiner*—Ling-Sui Choi
(74) *Attorney, Agent, or Firm*—Meyertons, Hood, Kivlin, Kowert & Goetzel, P.C.; Eric B. Meyertons

(57) ABSTRACT

The present invention provides a method for producing homo- and co-polymers of ethylene, or more particularly a method for producing homo- and co-polymers of ethylene in the presence of (a) a solid titanium catalyst produced by preparing a magnesium solution by contact-reacting a halogenated magnesium compound with an alcohol; reacting thereto an ester compound having at least one hydroxyl group and a silicon compound having at least one alkoxy group; and adding a mixture of a titanium compound and a silicon compound; (b) organometallic compounds of Group II or III of the Periodic Table; and (c) a cyclic nitrogen compound. The catalyst for homo- and co-polymerization of ethylene, produced according to the present invention, exhibits high activity, and the polymers produced by the method of the present invention by using said catalyst have the advantages of exhibiting high bulk densities and narrow molecular weight distributions.

11 Claims, No Drawings

U.S. PATENT DOCUMENTS

| | | | |
|---|---|---|---|
| 4,613,655 | A | 9/1986 | Longi et al. |
| 4,614,727 | A | 9/1986 | Longi et al. |
| 4,642,328 | A | 2/1987 | Morterol et al. |
| 4,673,719 | A | 6/1987 | Kioka et al. |
| 4,761,392 | A | 8/1988 | Shiga et al. |
| 4,777,639 | A | 10/1988 | Whitehouse |
| 4,806,433 | A | 2/1989 | Sasaki et al. |
| 4,816,433 | A | 3/1989 | Terano et al. |
| 4,829,037 | A | 5/1989 | Terano et al. |
| 4,843,049 | A | 6/1989 | Invernizzi et al. |
| 4,847,227 | A | 7/1989 | Murai et al. |
| 4,847,639 | A | 7/1989 | Sugata et al. |
| 4,866,022 | A | 9/1989 | Arzoumanidis et al. |
| 4,912,074 | A | 3/1990 | Miro |
| 4,946,816 | A | 8/1990 | Cohen et al. |
| 4,952,649 | A | 8/1990 | Kioka et al. |
| 4,962,167 | A | 10/1990 | Shiraishi et al. |
| 4,970,186 | A | 11/1990 | Terano et al. |
| 4,978,648 | A | 12/1990 | Barbe |
| 4,988,656 | A | 1/1991 | Arzoumanidis et al. |
| 4,990,479 | A | 2/1991 | Ishimaru et al. |
| 5,006,499 | A | 4/1991 | Daire |
| 5,013,702 | A | 5/1991 | Arzoumanidis et al. |
| 5,061,667 | A | 10/1991 | Murata et al. |
| 5,064,798 | A | 11/1991 | Chang |
| 5,081,090 | A | 1/1992 | Arzoumanidis et al. |
| 5,104,838 | A | 4/1992 | Fujita et al. |
| 5,106,807 | A | 4/1992 | Morini et al. |
| 5,124,297 | A | 6/1992 | Arzoumanidis et al. |
| 5,130,284 | A | 7/1992 | Terano et al. |
| 5,134,104 | A | 7/1992 | Sasaki et al. |
| 5,175,332 | A | 12/1992 | Chatterton et al. |
| 5,182,245 | A | 1/1993 | Arzoumanidis et al. |
| 5,244,996 | A | 9/1993 | Kawasaki et al. |
| 5,346,872 | A | 9/1994 | Menon et al. |
| 5,419,116 | A | 5/1995 | Rast et al. |
| 5,439,995 | A | 8/1995 | Bailly et al. |
| 5,455,316 | A | 10/1995 | Tsutsui et al. |
| 5,459,116 | A | 10/1995 | Ro et al. |
| 5,498,770 | A | 3/1996 | Hosaka et al. |
| 5,502,128 | A | 3/1996 | Flores et al. |
| 5,585,317 | A | 12/1996 | Sacchetti et al. |
| 5,587,436 | A | 12/1996 | Klimek et al. |
| 5,587,440 | A | 12/1996 | Ehlers et al. |
| 5,643,845 | A | 7/1997 | Tajima et al. |
| 5,696,044 | A | 12/1997 | Zakharov et al. |
| 5,726,261 | A | 3/1998 | Sacchetti et al. |
| 5,780,378 | A | 7/1998 | Toida et al. |
| 5,798,424 | A | 8/1998 | Kong et al. |
| 5,817,591 | A | 10/1998 | Shamshoum et al. |
| 5,844,046 | A | 12/1998 | Ohgizawa et al. |
| 5,849,654 | A | 12/1998 | Fushimi et al. |
| 5,849,655 | A | 12/1998 | Shamshoum et al. |
| 5,869,418 | A | 2/1999 | Iiskola et al. |
| 5,877,265 | A | 3/1999 | Toida et al. |
| 5,880,056 | A | 3/1999 | Tsutsui et al. |
| 5,936,049 | A | 8/1999 | Kojoh et al. |
| 5,965,478 | A | 10/1999 | Goto et al. |
| 5,968,862 | A | 10/1999 | Abbott et al. |
| 6,034,025 | A | 3/2000 | Yang et al. |
| 6,066,702 | A | 5/2000 | Ro et al. |
| 6,111,038 | A | 8/2000 | Kioka et al. |
| 6,114,276 | A | 9/2000 | Kong et al. |
| 6,214,759 | B1 | 4/2001 | Chang et al. |
| 6,235,854 | B1 | 5/2001 | Kioka et al. |
| 6,291,385 | B1 | 9/2001 | Lee et al. |
| 6,323,150 | B1 | 11/2001 | Kojoh et al. |
| 6,482,764 | B1 | 11/2002 | Chang et al. |
| 6,521,560 | B1 | 2/2003 | Kojoh et al. |
| 6,537,942 | B2 | 3/2003 | Shinozaki et al. |
| 6,559,250 | B2 | 5/2003 | Ro et al. |
| 2001/0031694 | A1 | 10/2001 | Yang et al. |
| 2002/0037980 | A1 | 3/2002 | Yang et al. |
| 2002/0045537 | A1 | 4/2002 | Yang et al. |
| 2002/0120079 | A1 | 8/2002 | Ro et al. |

FOREIGN PATENT DOCUMENTS

| | | |
|---|---|---|
| EP | 0350170 | 1/1990 |
| EP | 0385765 | 9/1990 |
| EP | 0602922 | 6/1994 |
| EP | 0606125 | 7/1994 |
| EP | 0607703 | 7/1994 |
| EP | 0669347 | 8/1995 |
| GB | 1335887 | 10/1973 |
| GB | 1492618 | 1/1975 |
| GB | 1577643 | 10/1980 |
| JP | 51136625 | 11/1976 |
| JP | 52111528 | 9/1977 |
| JP | 59145206 | 8/1984 |
| JP | 61055103 | 3/1986 |
| JP | 61268704 | 11/1986 |
| JP | 62081405 | 4/1987 |
| JP | 63199703 | 8/1988 |
| JP | 63-191811 | 9/1988 |
| JP | 63-54004 | 10/1988 |
| JP | 63308003 | 12/1988 |
| JP | 06-340711 | 5/1993 |
| JP | 07-330675 | 8/1995 |
| JP | 09176226 | 7/1997 |
| KR | 1020010084520 | 9/2001 |
| WO | WO 01/32718 | 5/2001 |
| WO | WO 01/78687 | 10/2001 |

OTHER PUBLICATIONS

Edelmann, "N–silylated benzamidines: versatile building blocks in main group and coordination chemistry," Coordination Chemistry Reviews, vol. 137, 1994, pp. 403–481.

Stokes et al., "Reactions of Cobaloxime Anions and/or Hydrides with Enynes as a New, General Route to 1,3– and 1,2–Dienylcobaloxime Complexes," Organometallics, 1996, vol. 15, pp. 2624–2632.

Zhou et al., "Synthesis and Structure of Novel Bridged Dinuclear Indium Complexes," Inorg. Chem., 1996, vol. 35, pp. 1423–1424.

Tinkler et al., "Polymerisation of ethene by the novel titanium complex [Ti(Me3SiNCH2CH2NsiMe3)CI2]; a metallocene analogue," Chem. Commun., 1996, pp. 2623–2624.

Linden et al., "Polymerization of a–Olefins and Butadiene and Catalytic Cyclotrimerization of 1–Alkynes by a New Class of Group IV Catalysts. Control of Molecular Weight and Polymer Microstructure via Ligand Tuning in Sterically Hindered Chelating Penoxide Titanium and Zirconium Species," J. Am. Chem. Soc., 1995, vol. 117, pp. 3008–3021.

Zhou et al., "Bulky Amidinate Complexes of Tin(IV). Synthesis and Structure of Sn(RNC(R')NR)2C22 (R=Cyclohexyl, R'=H, Me; R=SiMe3, R'=tBu)," Inorg. Chem., 1997, vol. 36, pp. 501–504.

Averbuj et al. "Stereoregular Polymerization of a–Olefins Catalyzed by Chiral Group 4 Benzamidinate Complexes of C1 and C3 Symmetry" J. Am. Chem. Soc,1998, vol. 120, 8640–8646.

* cited by examiner

METHOD FOR PRODUCING HOMO-AND CO-POLYMERS OF ETHYLENE

BACKGROUND OF THE INVENTION

1. Field of the Invention

The present invention provides a method for producing homo- and co-polymers of ethylene, or more particularly a method for producing homo- and co-polymers of ethylene using a high activity catalyst to produce said polymers with high bulk densities and narrow molecular weight distributions.

2. Description of the Related Art

Catalysts containing magnesium for polymerization or co-polymerization of ethylene are known to have very high catalytic activities and to produce polymers with high bulk densities. These catalysts are suitable for liquid phase or gas phase polymerization. Liquid phase polymerization of ethylene denotes a polymerization process performed in a medium such as bulk ethylene, isopentane, or hexane. One of the important characteristics of catalysts used in this process is high catalytic activity. The properties of the catalysts will also affect bulk density of the resultant polymers, etc. The molecular weight distribution of the polymer is also an important variable since it helps to determine the physical properties of the polymer. In particular, a narrow molecular weight distribution for ethylene polymers is a very important and advantageous characteristic with respect to injection processed goods.

Many titanium-based catalysts containing magnesium for olefin polymerization, and the manufacturing methods thereof have been reported. Many processes using magnesium solutions to produce catalysts that can generate olefin polymers with a high apparent bulk density are known. A magnesium solution may be obtained by reacting magnesium compounds with electron donors as alcohols, amines, cyclic ethers, or organic carboxylic acids in the presence of a hydrocarbon solvent. Examples using an alcohol are disclosed in U.S. Pat. Nos. 4,330,649 and 5,106,807. Furthermore, methods for production of catalysts containing magnesium by reacting a liquid-phase magnesium solution with a halogenated compound such as titanium tetrachloride are well known. Moreover, there have been attempts to control polymerization activity or molecular weight distribution by adding ester compounds. Such catalysts produce polymers with high bulk densities, but there are still improvements to be made with respect to catalytic activity and molecular weight distribution of the polymer product. Moreover, tetrahydrofuran, a cyclic ester, has been used as a solvent for a magnesium compound in U.S. Pat. Nos. 4,477,639 and 4,518,706.

U.S. Pat. Nos. 4,847,227, 4,816,433, 4,829,037, 4,970,186, and 5,130,284 teach the use of electron donors such as dialkylphthalate, phthaloyl chloride, etc. for reaction with a titanium chloride compound in the production of olefin polymerization catalysts exhibiting superior polymerization activity, which are also capable of enhancing the bulk density of the resultant polymers.

U.S. Pat. No. 5,459,116 teaches a method of production of a titanium solid catalyst by contact-reacting a magnesium solution containing an ester having at least one hydroxyl group as an electron donor with a titanium compound. By this method, a high activity polymerization catalyst was obtained, which produces polymers with high bulk densities, but there is still room for more improvement.

During polymerization of α-olefins, particularly, during polymerization of propylene, the external electron donors are generally used for increasing catalytic activity and stereo-regularity. External electron donors include organic compounds containing oxygen, silicon, nitrogen, sulfur, and phosphorus atoms, such as organic acids, organic anhydrides, organic acid esters, alcohols, ethers, aldehydes, ketones, silanes, amines, aminoxides, amides, diols, and phosphate esters.

SUMMARY OF THE INVENTION

The objective of the present invention is to provide a method for producing homo- and co-polymers of ethylene using catalysts with superior catalytic activity, wherein said polymers have high bulk densities and narrow molecular weight distributions. More particularly, the present invention provides a method for producing homo- and co-polymers of ethylene using catalysts with high polymerization activity. By controlling the shapes of the polymer particles, the polymers exhibit narrow molecular weight distributions.

Still other objectives and the utility of the present invention will become apparent as references are made with respect to the following descriptions and the claims thereto.

DETAILED DESCRIPTION OF THE PREFERRED EMBODIMENTS

The method for producing homo- and co-polymers of ethylene according to the present invention includes carrying out homo- or co-polymerization of ethylene in the presence of the following:

(a) a solid complex titanium catalyst produced by a simple, yet efficient, manufacturing process using magnesium, titanium, halogen and electron donors, which includes:

(i) preparing a magnesium solution by contact-reacting a halogenated magnesium compound with an alcohol;

(ii) reacting the solution with an ester compound containing at least one hydroxyl group and a silicone compound containing at least one alkoxy group; and (iii) adding a mixture of a titanium compound and a silicon compound;

(b) organometallic compounds of Groups II or III of the Periodic Table; and (c) a cyclic nitrogen compound.

Halogenated magnesium compounds that can be used to produce the catalysts of the present invention include di-halogenated magnesiums such as magnesium chloride, magnesium iodide, magnesium fluoride, and magnesium bromide; alkylmagnesium halides such as methylmagnesium halide, ethylmagnesium halide, propylmagnesium halide, butylmagnesium halide, isobutylmagnesium halide, hexylmagnesium halide, and amylmagnesium halide; alkoxymagnesium halides such as methoxymagnesium halide, ethoxymagensium halide, isopropoxymagnesium halide, butoxymagnesium halide, octoxymagnesium halide; and aryloxymagnesium halides such as phenoxymagnesium halide and methyl-phenoxymagnesium halide. Of the above magnesium compounds, two or more compounds can be used in a mixture. Furthermore, the above magnesium compounds can be effectively used in the form of a complex compound with other metals.

Of the compounds listed above, some can be represented by a simple formula; however, others cannot depending on the production methods of the magnesium compounds. In the latter cases, the magnesium compounds can generally be regarded as a mixture of some of the listed compounds. For example, compounds that can be used in the present invention include compounds obtained by reacting magnesium compounds with polysilolxane compounds, silane compounds containing halogen, ester, or alcohol; and compounds obtained by reacting magnesium metals with alcohol, phenol, or ether in the presence of halosilane, phosphorus pentachloride, or thionyl chloride. However, the preferable magnesium compounds are magnesium halides, especially magnesium chloride or alkylmagnesium chloride, preferably those having an alkyl group of 1–10 carbons; alkoxymagnesium chlorides, preferably those having 1–10 carbons; and aryloxymagnesium chlorides, preferably those having 6–20 carbons. The magnesium solution used in the present invention can be produced by mixing the aforementioned magnesium compounds with an alcohol solvent in the presence a hydrocarbon solvent or in the absence thereof.

The types of hydrocarbon solvents used in the present invention include aliphatic hydrocarbons such as pentane, hexane, heptane, octane, decane, and kerosene; alicyclic hydrocarbons such as cyclopentane, methylcyclopentane, cyclohexane, and methylcyclohexane; aromatic hydrocarbons such as benzene, toluene, xylene, ethylbenzene, cumene, and cymene; and halogenated hydrocarbons such as dichloropropane, dichloroethylene, trichloroethylene, carbon tetrachloride, and chlorobenzene.

When a halogenated magnesium compound is converted into a magnesium solution, alcohol is used in the presence of one or more of the aforementioned hydrocarbons or in the absence of thereof. The types of alcohol that can be used include those containing 1–20 carbon atoms, such as methanol, ethanol, propanol, butanol, pentanol, hexanol, octanol, decanol, dodecanol, octadecyl alcohol, benzyl alcohol, phenylethyl alcohol, isopropyl benzyl alcohol, and cumyl-alcohol, although an alcohol containing 1–12 carbon atoms is preferable. The average size of a target catalyst and its particle size distribution can vary according to the types and content of alcohol used, the types of magnesium compounds used, the ratio of magnesium to alcohol, etc. Nevertheless, the total amount of alcohol required to obtain the magnesium solution is at least 0.5 mole per mole of magnesium compound, preferably about 1.0–20 moles per mole of magnesium compound, or more preferably about 2.0–10 moles per mole of magnesium compound.

During the production of the magnesium solution, the reaction of a halogenated magnesium compound with an alcohol is preferably carried out in the presence of a hydrocarbon medium. The reaction temperature, while variable depending on the types and amount of alcohol used, is at least about −25° C., preferably about −10–200° C., or more preferably about 0–150° C. It is preferable to carry out the reaction for about 15 minutes to about 5 hours, preferably for about 30 minutes to about 4 hours.

The ester compounds containing at least one hydroxyl group used as electron donors in the present invention include unsaturated aliphatic acid esters having at least one hydroxyl group, such as 2-hydroxy ethylacrylate, 2-hydroxy ethylmethacrylate, 2-hydroxypropyl acrylate, 2-hydroxypropylmethacrylate, 4-hydroxy butylacrylate, and pentaerythritol triacrylate; aliphatic monoesters or polyesters containing at least one hydroxyl group, such as 2-hydroxy ethyl acetate, methyl 3-hydroxy butylate, ethyl 3-hydroxy butylate, methyl 2-hydroxy isobutylate, ethyl 2-hydroxy isobutylate, methyl-3-hydroxy-2-methyl propionate, 2,2-dimethyl-3-hydroxy propionate, ethyl-6-hydroxy hexanoate, t-butyl-2-hydroxy isobutylate, diethyl-3-hydroxy glutarate, ethyl lactate, isopropyl lactate, butyl isobutyl lactate, isobutyl lactate, ethyl mandelate, dimethyl ethyl tartrate, ethyl tartrate, dibutyl tartrate, diethyl citrate, triethyl citrate, ethyl-2-hydroxy-caproate, and diethyl bis-(hydroxy methyl) malonate; aromatic esters having at least one hydroxyl group, such as 2-hydroxy ethyl benzoate, 2-hydroxy ethyl salicylate, methyl-4-(hydroxy methyl) benzoate, methyl 4-hydroxy benzoate, ethyl 3-hydroxy benzoate, 4-methyl salicylate, ethyl salicylate, phenyl salicylate, propyl 4-hydroxy benzoate, phenyl 3-hydroxy naphthanoate, monoethylene glycol monobenzoate, diethylene glycol monobenzoate, and triethylene glycol monobenzoate; alicyclic esters having at least one hydroxyl group, such as hydroxybutyl lactone, and others. The amount of the ester compound containing at least one hydroxyl group should be 0.001–5 moles per mole of magnesium, or preferably about 0.01–2 moles per mole of magnesium.

Preferably, the silicon compound containing at least one alkoxy group, which can be used as another electron donor while producing catalysts used in the present invention, is represented by the general formula of $R_nSi(OR)_{4-n}$ (where R is a hydrocarbon having 1–12 carbons and n is an integer from 0 to 3). In particular, compounds that can be used include dimethyldimethoxysilane, dimethyldiethoxysilane, diphenyldimethoxysilane, methylphenylmethoxysilane, diphenyldiethoxysilane, ethyltrimethoxysilane, vinyltrimethoxysilane, methyltrimethoxysilane, phenyltrimethoxysilane, methyltricthoxysilane, ethyltriethoxysilane, vinyltriethoxysilane, butyltriethoxysilane, phenyltriethoxysilane, ethyltriisopropoxysilane, vinyltributoxysilane, ethylsilicate, butylsilicate, methyltriaryloxysilane, etc. The amount of said compound is preferably about 0.05–3 moles per mole of magnesium, or more preferably about 0.1–2 moles per mole of magnesium.

The contact-reaction of the magnesium solution with an ester compound containing at least one hydroxyl group and an alkoxy silicone compound may be performed at a temperature of about 0–100° C., or more preferably at a temperature of about 10–70° C.

To recrystalize the catalyst particles, the magnesium compound solution reacted with the electron donor is reacted with a mixture of a liquid titanium compound represented by the general formula of $Ti(OR)_aX_{4-a}$ (where R is a hydrocarbon group, X is a halogen atom, and a is a natural number from 0 to 4) and a compound represented by the general formula of $R_nSiCl_{4-n}$ (where R is hydrogen, or an alkyl, alkoxy, haloalkyl, or aryl group having 1–10 carbons, or a halosilyl, or a halosilylalkyl group having 1–8 carbons, and n is a natural number from 0 to 3).

The types of titanium compounds which satisfy the general formula of $Ti(OR)_aX_{4-a}$ include a 4-halogenated titanium such as $TiCl_4$, $TiBr_4$, and $TiI_4$; a 3-halogenated alkoxy-titanium such as $Ti(OCH_3)Cl_3$, $Ti(OC_2H_5)Cl_3$, $Ti(OC_2H_5)Br_3$, and $Ti(O(i\text{-}C_4H_9))Br_3$; a 2-halogenated alkoxy-titanium such as $Ti(OCH_3)_2Cl_2$, $Ti(OC_2H_5)_2Cl_2$, $Ti(O(i\text{-}C_4H_9))_2Cl_2$, and $Ti(OC_2H_5)_2Br_2$; and a tetra-alkoxy titanium such as $Ti(OCH_3)_4$, $Ti(OC_2H_5)_4$, and $Ti(OC_4H_9)_4$. A mixture of the above titanium compounds can also be used in the present invention. However, the preferable titanium compounds are those containing halogen, or more preferably titanium tetrachloride.

The types of silicon compounds satisfying the above general formula of $R_nSiCl_{4-n}$, (where R is hydrogen, an alkyl, alkoxy, haloalkyl, or aryl group having 1–10 carbons, or a halosilyl, or a halosilylalkyl group having 1–8 carbons, and n is a natural number from 0 to 3) include silicon tetrachloride; trichlorosilanes such as methyltrichlorosilane, ethyltrichlorosilane, phenyltrichlorosilane; dichlorosilanes such as dimethyldichlorosilane, diethyldichlorosilane, diphenyldichlorosilane, and methylphenyldichlorosilane; and monochlorosilanes such as trimethylchlorosilane. A mixture of these silicon compounds can also be used in the present invention, or more preferably silicon tetrachloride can be used.

The amount of the mixture of a titanium compound and a silicon compound used during re-crystallization of the magnesium compound solution is about 0.1–200 moles per mole of magnesium compound, preferably about 0.1–100 moles per mole of magnesium compound, or more preferably about 0.2–80 moles per mole of magnesium compound. The molar ratio of the silicon compound to the titanium compound in the mixture is about 1:0.05–1:0.95, or more preferably about 1:0.1–1:0.8.

When the magnesium compound solution is reacted with the mixture of a titanium compound and a silicon compound, the shapes and sizes of the re-crystallized solid constituents vary a great deal according to the reaction conditions. Hence, the reaction of the magnesium compound solution with the mixture of a titanium compound and a silicon compound should be carried out preferably at a sufficiently low temperature to result in formation of solid constituents. More preferably, the reaction should be carried out by contact-reaction at about −70–70° C., or most preferably at about −50–50° C. After the contact-reaction, the temperature is slowly raised over a period of about 0.5–5 hours to a temperature of about 50–150° C.

The particles of solid catalyst obtained during the above process can be further reacted with titanium compounds. These titanium compounds include titanium halides or halogenated alkoxy titaniums with an alkoxy functional group of 1–20 carbons. At times, a mixture of these compounds can also be used. Of these compounds, however, a titanium halide or a halogenated alkoxy titanium compound having an alkoxy functional group of 1–8 carbons can be appropriately used, or more preferably a titanium tetrahalide can be used.

The catalyst produced according to the process of the present invention can be utilized for homo- or co-polymerization of ethylene. In particular, the catalyst is used in homo- polymerization of ethylene, and also in co-polymerization of ethylene and α-olefins having three or more carbons such as propylene, 1-butene, 1-pentene, 4-methyl-1-pentene, or 1-hexene.

The polymerization reaction according to the present invention involves producing homo- and co-polymers of ethylene in the presence of the following:

(a) a solid complex titanium catalyst of the present invention including magnesium, titanium, halogen, and an electron donor;

(b) organometallic compounds of Groups II or III of the Periodic Table; and (c) a cyclic nitrogen compound.

The solid titanium catalyst component can be used as a component in the polymerization reaction after pre-polymerization with ethylene or an α-olefin. The pre-polymerization can be performed in the presence of a hydrocarbon solvent such as hexane, at a sufficiently low temperature or with ethylene or an α-olefin under pressure, in the presence of the above catalyst constituent and an organo aluminum compound as triethylaluminum. The pre-polymerization controls the shape of the catalyst particles by surrounding the catalyst particles with polymer. The control of particle shape is helpful in producing good-quality post-polymerization shapes of polymer product. The weight ratio of polymer to catalyst after pre-polymerization is ordinarily about 0.1:1–20:1.

The organometallic compound in the present invention can be represented by the general formula of $MR_n$, where, M represents a metal constituent of Group II or IIIA in the Periodic Table, such as magnesium, calcium, zinc, boron, aluminum, and gallium, R represents an alkyl group with 1–20 carbons, such as a methyl, ethyl, butyl, hexyl, octyl, or decyl group, and n represents the atomic valence of the metal constituent. Preferable organometallic compounds include trialkyl aluminums having an alkyl group of 1–6 carbons, such as triethylaluminum and triisobutylaluminum, or a mixture thereof. On occasion, an organo aluminum compound having one or more halogen or hydride groups, such as ethylaluminum dichloride, diethylaluminum chloride, ethylaluminum sesquichloride, or diisobutylaluminum hydride can also be used.

The external electron donor used in the present invention is a cyclic nitrogen compound. The types of cyclic nitrogen compounds that can be used include 2,6-lutidine, 2,3-dimethylquinoxaline, quinaldine, 2,4,6-collidine, 2,4-dimethylquinoline, 2-picoline, 2,3,5,6-tetramethylpyrazine, phenazine, acridine, di-t-butylpyridine, and mixtures thereof.

The polymerization reaction may be performed in either the gas phase or as a bulk polymerization in the absence of an organic solvent, or as a liquid phase slurry polymerization in the presence of an organic solvent. These polymerization methods, however, are performed in the absence of oxygen, water, and other compounds that may act as catalyst poisons.

For liquid phase slurry polymerizations, the concentration of the solid complex titanium catalyst (a) with respect to the polymerization reaction system is approximately 0.001–5 mmol, in terms of titanium atoms in the catalyst, per one liter of solvent, or more preferably approximately 0.001–0.5 mmol. Solvents that can be used include alkanes such as pentane, hexane, heptane, n-octane, isooctane, cyclohexane, and methylcyclohexane; alkylaromatics such as toluene, xylene, ethylbenzene, isopropylbenzene, ethyltoluene, n-propylbenzene, and diethylbenzene; halogenated aromatics such as chlorobenzene, chloronaphthalene, and ortho-dichlorobenzene; and mixtures thereof.

For gas phase polymerizations, the concentration of the solid complex titanium catalyst (a) should be approximately 0.001–5 mmol, in terms of titanium atoms in the catalyst, per one liter of the polymerization reactor, preferably approximately 0.001–1.0 mmol, or more preferably approximately 0.01–0.5 mmol.

The preferable concentration of the organometallic compound (b), as calculated based on the metal atom, is about 1–2,000 moles per mole of titanium atoms in catalyst (a), or more preferably about 5–500 moles.

The preferable concentration of said cyclic nitrogen compound (c) is approximately 0.001–40 moles per mole of metal atoms in the organometallic compound (b), or more preferably approximately 0.05–30 moles.

To provide a high reaction rate of polymerization, the polymerization is performed at a sufficiently high temperature regardless of the type of polymerization process. Generally, a temperature of approximately 20–200° C. is appropriate, or more preferably approximately 20–95° C. The appropriate pressure of monomer at the time of polymerization is about 1 atm to about 100 atm, or more preferably about 2 atm to about 50 atm.

The molecular weights of the polymers in the present invention are described by the melt index (ASTM D 1238), as is generally known in the art. The value of the melt index generally increases as the molecular weight decreases. The molecular weight distributions of the polymers were measured with gel permeation chromatography (GPC), the method of which is generally known in the art.

The products obtained by the method of polymerization of the present invention are solid ethylene homo-polymers or the copolymers of ethylene and an α-olefin, which exhibit excellent bulk density and fluidity. Since the yields of polymer are sufficiently high, there is no need for the removal of catalyst residues.

EXAMPLES AND COMPARATIVE EXAMPLES

The present invention is further described by means of the examples and comparative examples as described below but should not be confined or limited to these examples.

Example 1

Production of the catalyst

A solid complex titanium catalyst was produced by the following three steps:

(i) Production of a magnesium compound solution

A 1.0L reactor equipped with a mechanical stirrer was purged with nitrogen followed by the addition of 9.5 g of $MgCl_2$ and 600 ml of decane. After stirring at 500 rpm, 70 ml of 2-ethyl hexanol was added to the reactor. The temperature was raised to 120° C., and the reaction was allowed to continue for three hours. A homogenous solution was obtained and was cooled to room temperature (25° C.).

(ii) Contact-reaction of the magnesium solution with an ester containing a hydroxyl group and an alkoxy silane compound 0.8 ml of 2-hydroxyethyl methacrylate and 15.0 ml of silicon tetraethoxide were added to the cooled magnesium solution. The reaction was allowed to continue for an hour.

(iii) Treatment of the mixture with a titanium compound and a silicon compound

After adjusting the temperature of the solution to room temperature (25° C.), a solution of 50 ml of titanium tetrachloride and 50 ml of silicon tetrachloride was dripped into the reactor over the course of one hour. After completing the dripping process, the temperature of the reactor was raised to 70° C. and maintained at that temperature for one hour. After stirring, the mixture was cooled to room temperature and the supernatant of the solution was removed. The remaining solid layer was mixed with 300 ml of decane and 100 ml of titanium tetrachloride. The temperature was raised to 100° C. and maintained for two hours. After the reaction, the reactor was cooled to room temperature and the product was washed with 400 ml of hexane to remove the free unreacted $TiCl_4$. The titanium content of the solid catalyst so produced was 4.9%.

Polymerization

A 2-L high-pressure reactor was dried in an oven and assembled while hot. In order to completely purge the reactor, the reactor was filled with nitrogen and evacuated three times. The reactor was then filled with 1,000 ml of n-hexane followed by 3 mmol of triethylaluminum, 0.05 mmol of 1,2-lutidine, and 0.03 mmol, in terms of titanium atoms, of the above solid catalyst. 1,000 ml of hydrogen was then added. The temperature of the reactor was raised to 80° C. while stirring at 700 rpm. The pressure of ethylene was adjusted to 80 psi, and the polymerization was allowed to continue for an hour. After the polymerization, the temperature of the reactor was lowered to room temperature, and an excess of ethanol was added to the reactor contents. The polymer thus produced was collected by separation and was dried in a vacuum oven at 50° C. for at least six hours, whereby polyethylene was obtained in the form of a white powder.

The polymerization activity (kg of polyethylene produced divided by grams of catalyst) was calculated as a weight (kg) ratio of the polymers produced to the amount of catalyst so used (grams of catalyst). The results of the polymerization are shown in Table 1 along with the polymer bulk density (g/ml), melt index (g/10 minutes), and molecular weight distribution (Mw/Mn).

Examples 2–10

The polymerization was carried out in the same manner as in Example 1 with the catalyst produced in Example 1 and various types and concentrations of cyclic nitrogen compounds. The results are shown in Table 1.

Comparative Example 1

With the catalyst produced in Example 1, the polymerization was carried out in the same manner as in Example 1, but without using 1,2-lutidine during the polymerization process. The results are shown in Table 1.

Comparative Example 2

The catalyst was produced in the same manner as in Example 1, but without using 2-hydroxyethylmethacrylate and silicone tetraethoxide in step (ii) of the catalyst production. The titanium content of the catalyst so produced was 4.9%. The polymerization was carried out in the same manner as in Comparative Example 1, and the results are shown in Table 1.

Comparative Example 3

The catalyst was produced in the same manner as in Example 1, using 15.0 ml of silicon tetraethoxide but without 2-hydroxyethylmethacrylate in step (ii) of the catalyst production. The titanium content of the catalyst so produced was 4.7%. The polymerization was carried out in the same manner as in Comparative Example 1, and the results are shown in Table 1.

Comparative Example 4

The catalyst was produced in the same manner as in Example 1, using 0.8 ml of 2-hydroxyethylmethacrylate but without silicon tetraethoxide in step (ii) of the catalyst production of Example 1. The titanium content of the catalyst so produced was 4.1%. The polymerization was carried out in the same manner as in Comparative Example 1, and the results are shown in Table 1.

TABLE 1

| | Cyclic nitrogen compound | | Activity (kg PE/ | Melt | Bulk | Molecular Weight |
|---|---|---|---|---|---|---|
| Example | Compound | Amount (mmol) | g of catalyst) | Index (g/10 min) | Density (g/ml) | Distribution (Mw/Mn) |
| 1 | 2,6-lutidine | 0.05 | 5.0 | 1.6 | 0.36 | 5.2 |
| 2 | 2,4,6-collidine | 0.05 | 5.1 | 1.4 | 0.36 | 4.9 |

TABLE 1-continued

| | Cyclic nitrogen compound | | Activity (kg PE/ | Melt | Bulk | Molecular Weight |
|---|---|---|---|---|---|---|
| Example | Compound | Amount (mmol) | g of catalyst) | Index (g/10 min) | Density (g/ml) | Distribution (Mw/Mn) |
| 3 | quinaldine | 0.1 | 4.9 | 1.2 | 0.36 | 4.7 |
| 4 | 2,3,5,6-tetramethylpyrazine | 0.05 | 5.2 | 1.4 | 0.35 | 4.6 |
| 5 | 2-picoline | 0.1 | 4.8 | 1.9 | 0.36 | 5.4 |
| 6 | 2,3-dimethylquinoxaline | 0.05 | 5.2 | 1.7 | 0.38 | 5.1 |
| 7 | 2,4-dimethylquinoline | 0.05 | 5.0 | 1.5 | 0.37 | 5.2 |
| 8 | di-t-butylpyridine | 0.05 | 5.1 | 1.4 | 0.36 | 4.5 |
| 9 | phenazine | 0.1 | 4.7 | 1.8 | 0.36 | 5.4 |
| 10 | acridine | 0.1 | 4.9 | 1.7 | 0.37 | 5.2 |
| CE* 1 | — | — | 4.4 | 3.4 | 0.36 | 6.8 |
| CE* 2 | — | — | 3.4 | 0.8 | 0.30 | 7.0 |
| CE* 3 | — | — | 4.1 | 1.8 | 0.33 | 6.7 |
| CE* 4 | — | | 4.2 | 2.2 | 0.34 | 6.4 |

*CE: comparative example.

As shown above, the method of the present invention makes it possible to produce homo- and co-polymers of ethylene, which have a high bulk density and a narrow molecular weight distribution, with high polymerization activity.

What is claimed is:

1. A method for producing homo- and co-polymers of ethylene, which comprises carrying out polymerization in the presence of:

(a) a solid titanium catalyst produced by the method comprising:

(i) preparing a magnesium compound solution by contact-reacting a halogenated magnesium compound with an alcohol;

(ii) reacting the magnesium compound solution with electron donors, the electron donors comprising an ester compound having at least one hydroxyl group and a first silicon compound having at least one alkoxy group; and (iii) reacting the mixture resulting from the reaction of the magnesium compound solution with electron donors with a titanium compound and a second silicon compound;

(b) organometallic compounds of Group II or III of the Periodic Table; and (c) a cyclic nitrogen compound.

2. The method according to claim 1, wherein said ester compound having at least one hydroxyl group is an unsaturated aliphatic acid ester having at least one hydroxyl group, an aliphatic monoester or polyester containing at least one hydroxyl group, an aromatic ester having at least one hydroxyl group, or an alicyclic ester having at least one hydroxyl group, and wherein said first silicon compound having at least one alkoxy group is represented by a general formula of $R_nSi(OR)_{4-n}$, where R stands for a hydrocarbon having 1~12 carbons; and n for an integer of 0~3.

3. The method according to claim 1, wherein said titanium compound is represented by a general formula of $Ti(OR)_a X_{4-a}$, where R stands for a hydrocarbon group, X for a halogen atom, and a for a natural number of 0~4; and wherein said silicon compound is represented by a general formula of $R_nSiCl_{4-n}$, where R stands for hydrogen; an alkyl, alkoxy, haloalkyl, or aryl group having 1~10 carbons; or a halosilyl or halosilylalkyl group having 1~8 carbons; and n for a natural number of 0~3.

4. The method according to claim 1, wherein said titanium compound is a 4-halogenated titanium, a 3-halogenated alkoxytitanium, a 2-halogenated alkoxytitanium, and a tetralkoxytitanium and wherein said second silicon compound is silicon tetrachloride, a trichlorosilane, a dichlorosilane, or a monochlorosilane.

5. The method according to claim 1, wherein said titanium compound is titanium tetrachloride, and said second silicon compound is silicon tetrachloride.

6. The method according to claim 1, wherein said solid titanium catalyst is produced by further reacting the product of step (a)(iii) with an additional titanium compound.

7. The method according to claim 1, wherein said cyclic nitrogen compound is 2,6-lutidine, 2,3-dimethylquinoxaline, quinaldine, 2,4,6-collidine, 2,4-dimethylquinoline, 2-picoline, 2,3,5,6-tetramethylpyrazine, phenazine, acridine, di-t-butylpyridine, or a mixture thereof.

8. The method according to claim 1, wherein said ester compound having at least one hydroxyl group is an unsaturated aliphatic acid ester having at least one hydroxyl group; an aliphatic monoester or polyester containing at least one hydroxyl group; an aromatic ester having at least one hydroxyl group; or an alicyclic ester having at least one hydroxyl group.

9. The method according to claim 1, wherein said first silicon compound is represented by a general formula of $R_nSi(OR)_{4-n}$, where R stands for a hydrocarbon having 1~12 carbons; and n for an integer of 0~3.

10. The method according to claim 1, wherein said titanium compound is represented by a general formula of $Ti(OR)_aX_{4-n}$, where R stands for a hydrocarbon group, X for a halogen atom, and a for a natural number of 0~4.

11. The method according to claim 1, wherein said second silicon compound is represented by a general formula of $R_nSiCl_{4-n}$, where R stands for hydrogen; an alkyl, alkoxy, haloalkyl, or aryl group having 1~10 carbons; or a halosilyl or halosilylalkyl group having 1~8 carbons; and n for a natural number of 0~3.

* * * * *